United States Patent [19]
Ziegelmeyer

[11] 3,762,827
[45] Oct. 2, 1973

[54] VARIABLE DWELL CONTROL ATTACHMENT

[75] Inventor: Harold R. Ziegelmeyer, Medford, Conn.

[73] Assignee: McDonnell Douglas Corporation

[22] Filed: July 27, 1972

[21] Appl. No.: 275,708

[52] U.S. Cl................. 408/14, 408/134, 90/11 E, 173/156
[51] Int. Cl............................................. B23b 47/24
[58] Field of Search.............. 408/12, 14, 11, 15, 408/134, 138; 90/11 E; 173/10, 156

[56] References Cited
UNITED STATES PATENTS

| | | | |
|---|---|---|---|
| 567,793 | 9/1896 | Riddell | 408/134 X |
| 2,271,717 | 2/1942 | Schwartz | 408/11 X |
| 2,689,363 | 9/1954 | Frye | 408/11 |
| 2,780,116 | 2/1957 | Schafer | 408/11 |
| 2,796,161 | 6/1957 | Graybill | 408/14 X |
| 3,487,729 | 1/1970 | Juhasz et al. | 408/14 |

Primary Examiner—Andrew R. Juhasz
Assistant Examiner—Z. R. Bilinsky
Attorney—Walter J. Jason et al.

[57] ABSTRACT

An attachment for an automatic feed material cutting machine to cause the cutting tool to dwell at the end of its axial feed stroke before retraction, thereby improving the interior finish of the cut surface. Relatively slidable members having an adjustable stop means mounted thereon, allows relative axial movement between the cutting tool and the positive feed power source.

6 Claims, 3 Drawing Figures

PATENTED OCT 2 1973 3,762,827
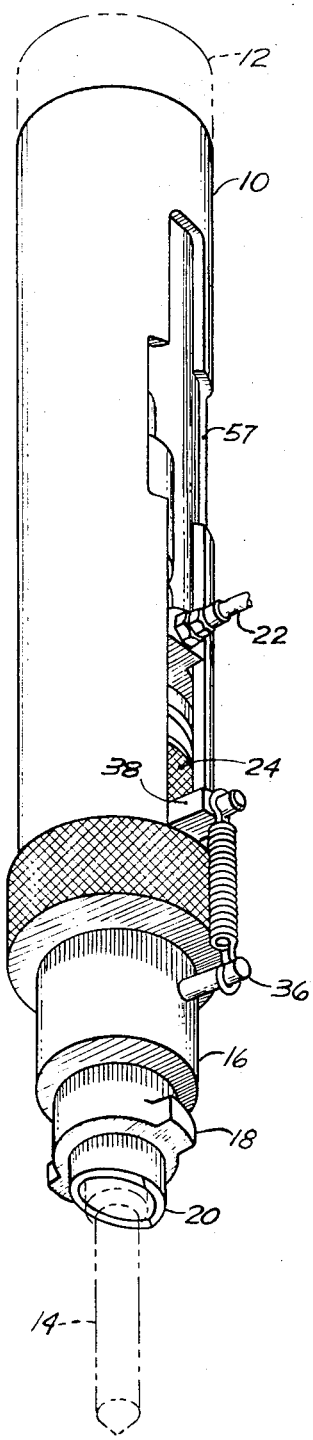
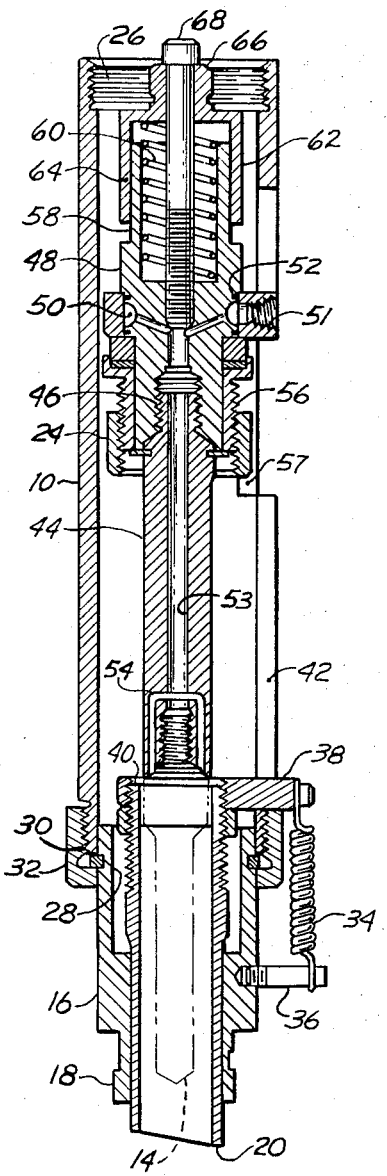
FIG. 1
FIG. 2
FIG. 3

VARIABLE DWELL CONTROL ATTACHMENT

BACKGROUND OF THE INVENTION

The problem for which the present invention is the solution originated with a need to countersink holes when the work piece is not of uniform thickness or when the top surface is not normal to the axis of the cutting tool. An automatic feed drilling machine has a sensing sleeve thereon which contacts the upper surface on the low side of the hole. From this reference point the automatic feed will cause the cutting tool to penetrate to a desired depth whether it be the cutting of a blind hole or the counter-boring or the countersinking of a hole. When the drill has penetrated to the desired depth, the automatic feed mechanism reverses and the cutting tool is removed from the hole. The immediate area of contact under the cutting blade as it is cutting and then withdrawn is left with a rough spot, irregularity, or a gouge which then requires subsequent reaming, cutting or polishing to present a suitable cut surface.

Of interest in the prior art are U.S. Pat. No. 2,780,116 for Adjustable Control Assembly for Machine Tools issued Feb. 5, 1957 to R. A. Schaffer and U.S. Pat. No. 2,689,363 for Automatic Stop and Timer for Machine Tool Control issued Sept. 21, 1954 to C. F. Frye. Both of these patents teach the concept of utilizing a cutting tool dwell period at the end of its predetermined stroke to improve the finish of the holes being drilled. Both patents show means of adjusting the stroke of a drilling device and means of adjusting a dwell period at the end of its stroke before retraction from the work piece. However, neither patent shows the use of a dwell timing device consisting of relatively slidable members having adjustable stop means mounted thereon but, instead, rely on pneumatic timing devices. Also, neither of the patents show devices which allow relative axial movement between the cutting tool and the positive feed power source.

SUMMMARY OF THE PRESENT INVENTION

This is an attachment for an automatic feed material cutting machine to cause the cutting tool to dwell at the end of its axial feed stroke before retraction to thereby improve the finish of the cut surface. This attachment consists of an outer hollow cylindrical portion within which is located a take-up spindle slidingly affixed to a positive feed power source such that the take-up may move axially relative to the power source but at all times will rotate with the power source. Attached to the opposite end of the take-up spindle is a sensing sleeve surrounding a chuck device in which the cutting tool is mounted. The sensing sleeve has a plurality of collars threadingly attached to its outer surface adjacent to the take-up spindle. These collars provide a means of adjusting the length of the stroke into the work piece. In operation, as the tool reaches the desired limit of its insertion into the work piece, a collar contacts a shoulder on the interior surface of the surrounding outer cylinder thereby causing the tool, sensing sleeve, and take-up spindle to cease axial motion. A compression spring affixed between the take-up spindle and the positive feed power source allows the power source to continue its axial feeding motion and drill rotation without the cutting tool entering further into the work piece. The adjustment of the collars on the sensing sleeve determines the depth of the cut.

BRIEF DESCRIPTION OF THE DRAWINGS

FIG. 1 is a perspective view of the variable dwell control attachment;

FIG. 2 is a sectional view of the attachment with a cutter in retracted position; and FIG. 3 is a sectional view of the attachment with a cutter in extended position.

DETAILED DESCRIPTION OF ILLUSTRATIVE EMBODIMENT

As shown in FIG. 1 the variable dwell control attachment includes a housing 10 adapted to fit onto a rotary power tool 12 and transmit rotary and axial movement to a cutting tool 14. A nose lock bushing 16 on the end of the housing 10 has two cammed ears 18 for insertion into a drill bushing embedded in a drill bar, not shown, but more fully described in co-pending patent application Drill Bushing System application no. 231,258 filed Mar. 2, 1972 by Arthur Marcoux. A sensing sleeve 20 contacts the work surface on the low side of the hole to establish a reference point for depth control. A coolant line 22 connects to a hollow spindle within the housing for lubricating the cutting tool 14. A positive stop mechanism 24 is adjustable to regulate the depth of cut by cutting tool 14 relative to the end of the sensing sleeve 20. When the cutting tool 14 reaches its desired depth, the motor feed mechanism no longer drives the cutting tool 14 into the work piece but does permit it to continue rotation in a manner to be explained with reference to FIGS. 2 and 3.

FIG. 2 is a sectional view with the cutter 14 in retracted position. Here is shown the sleeve 10 having an upper end 26 adapted for attachment to a power source, not shown, which is of both rotary and screw feed type readily available on the market. The nose lock bushing 16 has a stop ring 28 for abutting against the lower end 30 of sleeve 10. Lower end 30 has external threads and a retainer nut 32 threadedly engages this end to hold stop ring 28 in its abutting position, to thereby retain the nose lock bushing 16 in the position shown. The cylindrical sensor sleeve device 20 is axially movable within the nose lock bushing and is urged to its outermost position by means of a spring 34 engageable between an external fitting 36 on the nose lock bushing 16 and a wing plate 38 mounted on the inner end 40 of the sensor 20. A slot 42 in sleeve 10 permits the wing plate 38 to move in an axial direction with the sensor 20. Spring 34 causes wing plate 38 to abut against the retainer nut 32 in the position shown, except when the surface of the work piece, not shown, pushes sensor 20 upwardly after the ears 18 have been inserted into the drill bar bushing liner, not shown but set forth in co-pending patent application previously referred to.

Cutting tool 14 is threadedly mounted on the lower end of hollow spindle 44. This hollow spindle is threadedly connected at its upper end 46 to a take-up spindle 48. Within the take-up spindle is a coolant passage ring 50 adapted to receive a coolant from coolant supply source ring 51 to which is connected the coolant line 22 shown in FIG. 1. Coolant seals 52 are mounted on both sides of a coolant passage to prevent leakage as the take-up spindle rotates. Coolant fluid thus goes through passage ring 50, through the hollow passageway 53 in spindle 44, through connecting outlets 54, and onto the cutting tool 14. Threadedly mounted on the take-up spindle 48 is an adjustable positive stop mechanism 24 that may be manually threaded axially along the threaded portion 56 of the take-up spindle 48. The outer surface of the threaded adjustable stop 24 is knurled and is accessible to the operator through the opening 57 in housing sleeve 10. As the hollow spindle 44 moves axially downwardly, the positive stop nut 24 will engage the wing plate 38 on the sensor 20 to prevent further axial travel. This can be seen with reference to FIG. 3.

The upper end of take-up spindle 48 includes a cylindrical wall 58 in which is positioned a dwell spring 60. A dwell housing assembly 62 has a cylindrical wall 64 telescopically engagable over the cylindrical walls 58 on the take-up spindle. This drill housing assembly 62 has a central threaded connector 66 for connection to the rotary and feed power tool, not shown. A retaining bolt 68 passes through the dwell housing assembly 62 and is threadedly connected to the take-up spindle. The dwell spring 60 urges the dwell housing assembly 62 upwardly relative to the take-up spindle 48, although clearance is provided for their telescopic compression against the force of the spring.

When the power tool exerts rotary and axial feed to the threaded connector 66 of the dwell housing assembly 62, the cutting tool 14 moves downwardly to its position shown in FIG. 3 until the adjustable positive stop nut 24 engages the wing plate 38, at which time the take-up spindle 48 has no further axial movement although it continues to rotate as does the cutting tool 14. At this point the rotary feed continues to urge the dwell housing assembly 62 downwardly against the compression force of dwell spring 60. In this manner cutting tool 14 continues to rotate in the absence of axial travel and thus cleans the surface of the hole with which the cutting portion of the cutting tool is in contact. The tool can then be retracted either manually or by automatic means associated with the rotary and drive feed mechanism, not shown.

Having thus described the illustrative embodiment of this invention, it is to be understood that variations and modifications will readily appear to those skilled in the art, and it is to be understood that these deviations from the embodiment just described are intended to be part of the invention as set forth in the appended claims.

I claim:

1. A variable dwell control attachment comprising an outer sleeve for attachment at its upper end to a housing of a rotary power source,
a nose lock bushing attached to the lower end of said sleeve,
a sensing sleeve telescopically slidable within said bushing,
a cutting tool and spindle rotatably mounted within said outer sleeve and adapted to pass through said sensing sleeve,
said spindle having a take-up spindle thereon with cylindrical walls having a compression spring therein,
a dwell housing assembly having a cylindrical wall telescopically mounted over said spring and the cylindrical wall of said take-up spindle,
said dwell housing assembly having means thereon for connection with a rotary power source,
said take-up spindle having stop means thereon for engaging said sensing sleeve to limit axial movement of said cutting tool relative to said sensing sleeve, whereby further downward movement on said dwell housing assembly compresses said spring and permits continued rotation of said cutting tool without axial movement thereof.

2. A variable dwell control attachment as set forth in claim 1 wherein said stop means is axially movable along said take-up spindle to thereby adjust the cutting tool movement relative to the end of said sensing sleeve.

3. A variable dwell control attachment as set forth in claim 1 wherein said spindle has a bore therethrough communicating with said cutting tool, and said take-up spindle has a coolant passage therein connected to said bore whereby said cutting tool may be supplied with a coolant during rotation thereof.

4. A variable dwell control attachment as set forth in claim 1 wherein said outer sleeve has a longitudinal slot therein, said sensing sleeve has a wing plate thereon extending outwardly through the slot, and means on the outer surface of said bushing attached to said wing plate for resiliently urging said sensing sleeve downwardly through said bushing.

5. A variable dwell control attachment as in claim 1 wherein the power source exerts a rotary and downward force on said dwell housing assembly.

6. A variable dwell control attachment as in claim 1 wherein said take-up spindle and said dwell housing assembly are maintained in outwardly biased relationship by said compression spring until the take-up spindle stop means engages the sensing sleeve to stop further axial travel of the take-up spindle and the dwell housing assembly continues axial travel against the compression of said spring.

* * * * *

PO-1050
(5/69)

UNITED STATES PATENT OFFICE
CERTIFICATE OF CORRECTION

Patent No. 3,762,827                Dated 2 October 1973

Inventor(s) Harold R. Ziegelmeyer

It is certified that error appears in the above-identified patent and that said Letters Patent are hereby corrected as shown below:

On the Title page delete inventor's home State "Conn." and insert --Oregon-- therefor.

Signed and sealed this 2nd day of July 1974.

(SEAL)
Attest:

EDWARD M. FLETCHER, JR.         C. MARSHALL DANN
Attesting Officer               Commmissioner of Patents